United States Patent [19]

Crepas et al.

[11] Patent Number: 5,404,963
[45] Date of Patent: Apr. 11, 1995

[54] POWER DIVIDER LUBRICATION IN TANDEM DRIVING AXLES

[75] Inventors: Robert E. Crepas, Mattawan; Gerard W. DeVito, Kalamazoo; Daniel H. Flight, Portage; Dale L. Kwasniewski, Kalamazoo; Steven D. McKeeby, Lawton, all of Mich.

[73] Assignee: Eaton Corporation, Cleveland, Ohio

[21] Appl. No.: 144,267

[22] Filed: Oct. 28, 1993

[51] Int. Cl.⁶ ............................................... F01M 9/00
[52] U.S. Cl. .................................. 184/6.12; 184/11.2; 74/467; 384/473
[58] Field of Search ............. 184/6.12, 11.1, 11.2, 184/12; 74/665 GB, 467, 665 GC; 384/471, 472, 473

[56] References Cited

U.S. PATENT DOCUMENTS

| | | | |
|---|---|---|---|
| 3,583,526 | 6/1971 | Mulleder et al. | 74/467 |
| 4,221,279 | 9/1980 | Jones et al. | 74/467 |
| 4,231,266 | 11/1980 | Nishikawa et al. | 184/6.12 |
| 4,241,959 | 12/1980 | Frister | 384/472 |
| 4,359,142 | 11/1982 | Schultz et al. | 74/467 |
| 5,161,644 | 11/1992 | Swenskowski et al. | 184/6.12 |

FOREIGN PATENT DOCUMENTS

| | | | |
|---|---|---|---|
| 955571 | 12/1956 | Germany | 184/6.12 |
| 0311277 | 1/1930 | United Kingdom | 184/11.2 |

*Primary Examiner*—Thomas E. Denion
*Attorney, Agent, or Firm*—Roger A. Johnston; Howard D. Gordon

[57] ABSTRACT

A lubrication system for the helical gear thrust washer, helical gear journal and inter-axle differential in tandem drive axles. The leading drive axle input shaft is journalled in a bearing supplied on one side with a gravity flow of lubricant from a passage receiving lubricant slinging from the power divider periphery, which receives lubricant slinging from the axle ring gear. The opposite side of the bearing has an annular lubricant chamber therearound formed by an annular baffle member surrounding the input shaft on the interior side of the bearing. The bearing is operative to pump lubricant to the annular chamber. An axial passage formed through a portion of the input shaft communicates the annular chamber with the differential gears. In one form the annular baffle member rotates with the input shaft and in the other form it is stationary. In some embodiments the baffle has an elastomeric lip seal therearound; and, in the other embodiments, the baffle defines an annular labyrinth passage restricting return flow to the sump from the annular chamber.

12 Claims, 6 Drawing Sheets

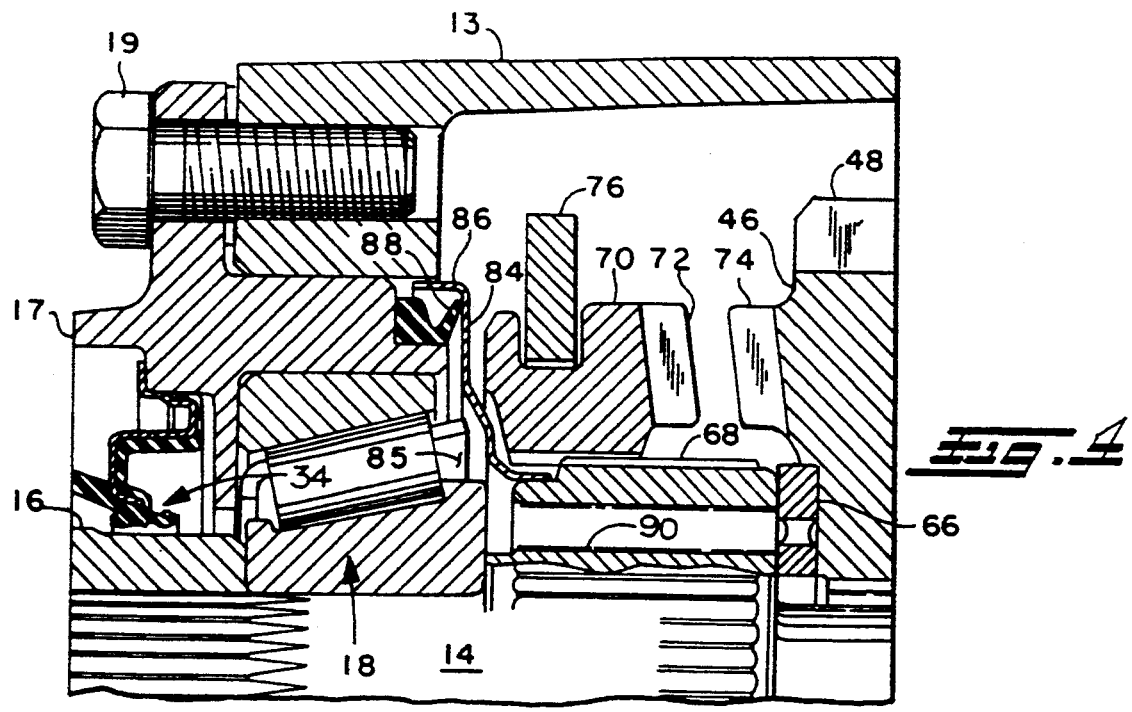
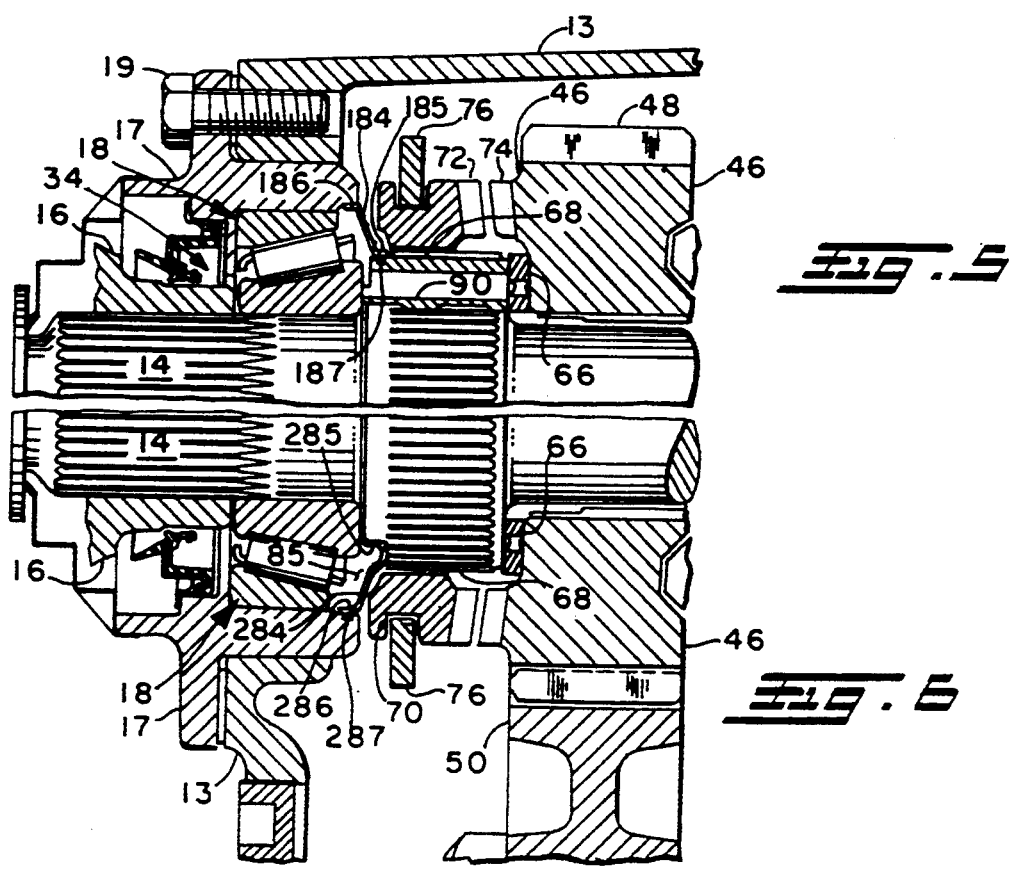

POWER DIVIDER LUBRICATION IN TANDEM DRIVING AXLES

BACKGROUND OF THE INVENTION

The present invention relates to driving axles, and particularly to tandem arrangements of driving axles having an input shaft driving a power divider which, in turn, drives one of the driving axles and also an output shaft for connection to the second driving axle. Typically, the power divider takes the form of an inter-axle differential having the carrier containing the differential or spider gears driven by the input shaft. In such an inter-axle differential arrangement, the differential gears typically drive, on one side thereof, a helical gear which meshes with a pinion shaft gear for driving the pinion of the first driving axle. The opposite side of the differential gears typically mesh with a gear formed on the output shaft for driving the second drive axle. Usually, a clutching arrangement is provided on the helical gear for locking the helical gear to the input shaft when loss of traction in encountered at the wheels. Locking the interaxle differential allows the torque to be transferred to the axle with the most available traction.

It is common practice in tandem driving axle arrangements to provide a thrust washer for absorbing the axial loading of the helical gear by the differential gears for driving the first driving axle. The thrust washer typically bears on one side thereof against the helical gear and on its other side against a shoulder provided on the input shaft with the helical gear disposed annularly about the input shaft for free rotation thereon when the clutch is disengaged.

In such a thrust washer arrangement, severe wear problems have been encountered in heavy service both at the thrust washer and the helical gear journal; and, it has been determined that the wear problems are due, in part, to insufficient lubrication. Typically, lubrication to the power divider component in a tandem drive axle arrangement has been provided by splash from the ring gear to which the pinion shaft is engaged in the first driving axle whereby lubricant is thrown from the ring gear into the power divider area. However, this method of splash lubrication from the ring gear has not provided sufficient lubrication to a thrust washer located on the opposite side of the differential gears from the ring gear.

Thus, it has long been desired to provide a simple, economical, and easily manufactured way or means of providing lubricant to the thrust washer in the power divider in a tandem drive axle.

SUMMARY OF THE INVENTION

The present invention provides a unique way or means of lubricating difficult to lubricate components of a power divider, and particularly power dividers comprising a differential. In the power divider lubricating arrangement of the present invention, a window channel or passage is provided in the axle housing for collecting lubricant slinging from the driven axle ring gear to the periphery of the power divider and particularly the interaxle differential case, which slings lubricant over to another window in the side of the housing, which collects lubricant for gravity feed to one side of the input shaft journal bearing 18 which is typically a tapered roller bearing race. The opposite side of the input shaft roller bearing is closed by a plate or baffle which retains lubricant pumped through the bearing in an annular chamber about the bearing on the opposite side from the gravity feed. The pumping action of the bearing creates a slight positive pressure in the chamber and forces the lubricant through an axial passage provided through an enlarged diameter portion of the input shaft which communicates with the annular chamber, and the passage leads oil directly to the thrust washer. The baffle or plate provides an annular chamber which has a restricted passage to permit oil to return to the sump. In one embodiment, the annular baffle has a rotating elastomeric seal; and, in another embodiment, the seal is stationary. In other embodiments, the annular chamber is provided by close spacing of the annular baffle from portions of the axle housing about the input shaft bearing. The present invention thus forms a lubricant chamber about the input shaft journal bearing to enable the bearing to create a positive pressure therein by pumping lubricant through the bearing from the sump. The pressurized lubricant from the chamber flows through an axial passage in the input shaft communicating with the chamber to lubricate interior components of the power divider such as the thrust washer and the helical gear journal.

BRIEF DESCRIPTION OF THE DRAWINGS

FIG. I is a cross-section, taken in a vertical plane through the power input shaft axis of the driving axle having a power divider employing the lubrication of the present invention;

FIG. 4 is an enlarged view of a portion of FIG. 1;

FIG. 5 is a view similar to FIG. 4, showing a portion of an alternate embodiment of the invention;

FIG. 6 is a view similar to FIG. 5, showing another embodiment of the invention;

DETAILED DESCRIPTION

Figure 1:
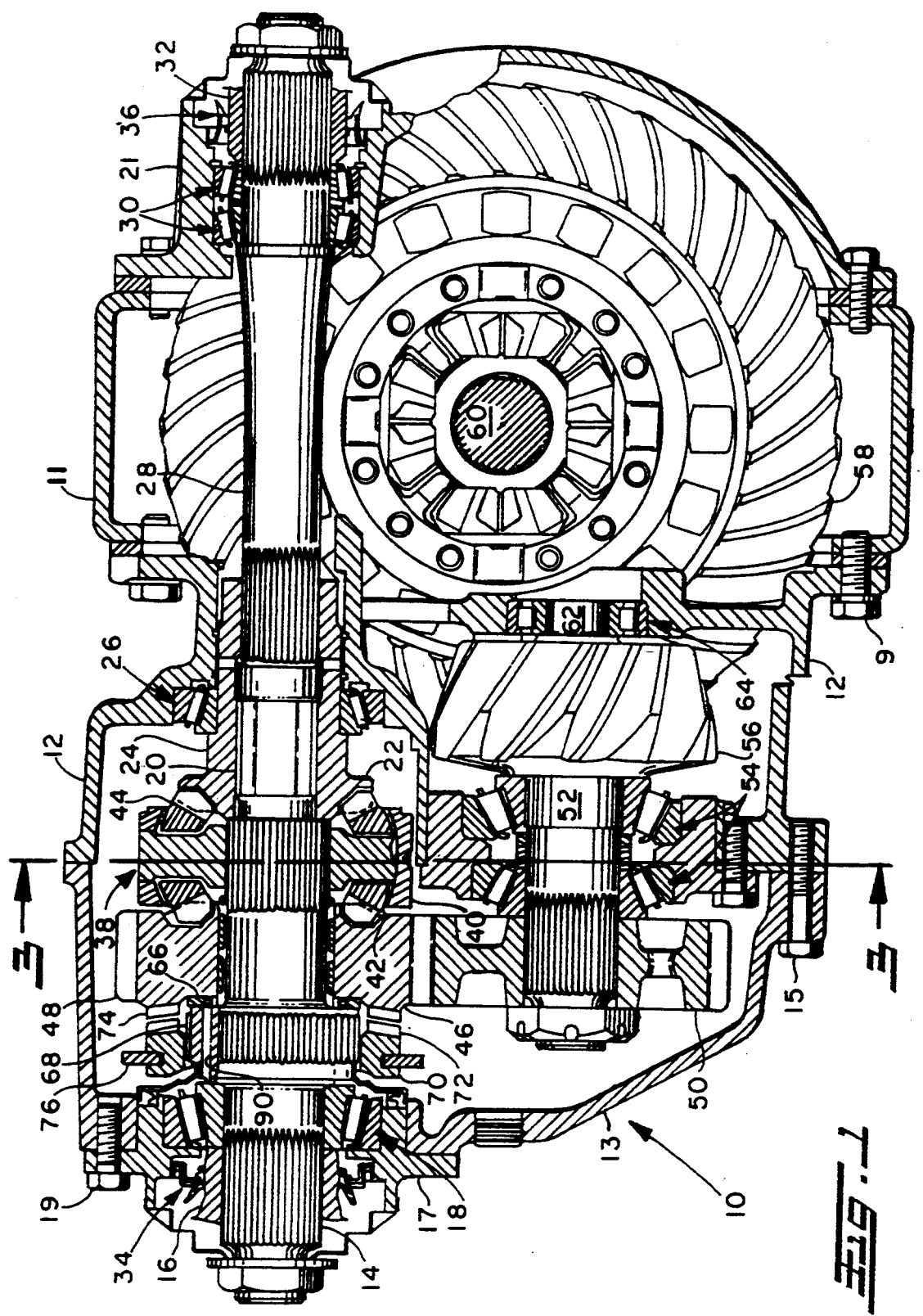

Referring to FIG. 1, the present invention is illustrated as embodied in a driving axle assembly indicated generally at 10, which is typically the leading driving axle in a tandem axle arrangement. Axle assembly 10 is housed in a case comprising carrier 12 bolted to axle "banjo" housing 11 by bolts 9, and a power divider, or front, cover 13 bolted to carrier 12 by bolts 15, and has an input shaft 14 receiving power from a driving yoke 16 adapted for attachment to a propeller shaft. Input shaft 14 is journalled for rotation in a tapered roller bearing assembly indicated generally at 18, the outer race of which is mounted in a bearing cage 17 secured to cover 13 by bolt 19. Input shaft 14 has a pilot diameter 20 provided on the end thereof opposite yoke 16; and, pilot in diameter 20 is received in the end of an output shaft gear 22 and is closely interfitted therewith and freely rotatable therein.

Output shaft gear 22 has a hub 24 thereon which is received and guided in the inner race of a bearing assembly indicated generally at 26 which is mounted on carrier 12. Gear hub 24 has received therein in splined engagement output shaft 28, which extends outwardly through the casing and is journalled in a pair of tapered roller bearings indicated generally at 30, the outer races of which are mounted in a housing cover bearing cap 21 attached to the axle housing 11. Output shaft 28 has a yoke 32 on the external end thereof which is adapted for articulated driving connection to the input shaft of a trailing drive axle (not shown).

Input shaft 16 has an oil seal indicated generally at 34 disposed annularly thereabout. Similarly, output shaft 28 has an oil seal indicated generally at 36 for sealing lubricant about the hub of yoke 32 to retain lubricant in the carrier.

A power divider indicated generally at 38 is provided between the input shaft 14 and the output shaft 28; and, in present practice of the invention, the power divider comprises an inter-axle differential having a spider 40 splined to input shaft 14. The spider 40 has at least a pair of oppositely disposed differential gears 42,44 which on one side thereof engage the output shaft gear 22 and on the opposite side thereof a leading axle drive gear 46 by means of a set of teeth provided on the axial face of gear 46.

Gear 46 is disposed annularly about and freely rotatable on the input shaft 14, and has a plurality of peripheral preferably helical teeth 48 provided thereon which engage a pinion shaft gear 50. Pinion shaft gear 50 is drivingly splined to a pinion shaft 52, which is journalled in pair of tapered roller bearing races indicated generally at 54. Pinion shaft 52 has a drive pinion 56 formed thereon which engages a ring gear 58 which is operable, typically through another differential, to drive a wheel axle 60.

As is well known in the art, pinion gear 56 has a pilot shaft 62 formed on the endface thereof which is journalled in a roller bearing race indicated generally at 64, which is mounted in the housing 12.

Helical gear 46 has a thrust washer 66 provided on the axial face thereof opposite the differential gears 42,44; and, the thrust washer 66 is slidingly registered against the axial face of raised diameter portion 68 formed on the input shaft 14 between the bearing assembly 18 and the helical gear 46.

Figure 2:
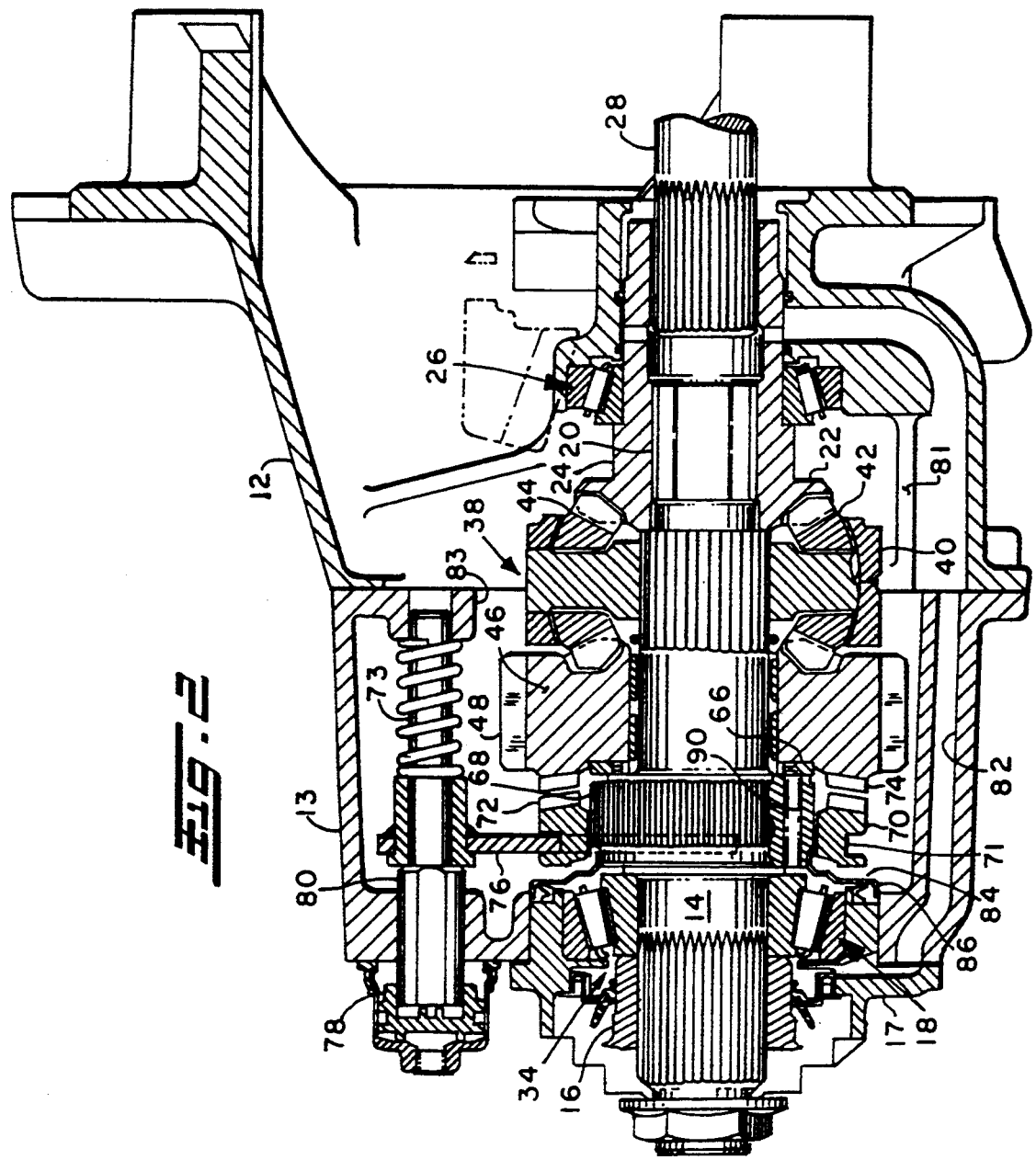
FIG. 2 is an enlarged view of a portion of a section view taken on a horizontal plane through the power input shaft and at right angles to the view of FIG. 1.
Figure 3:
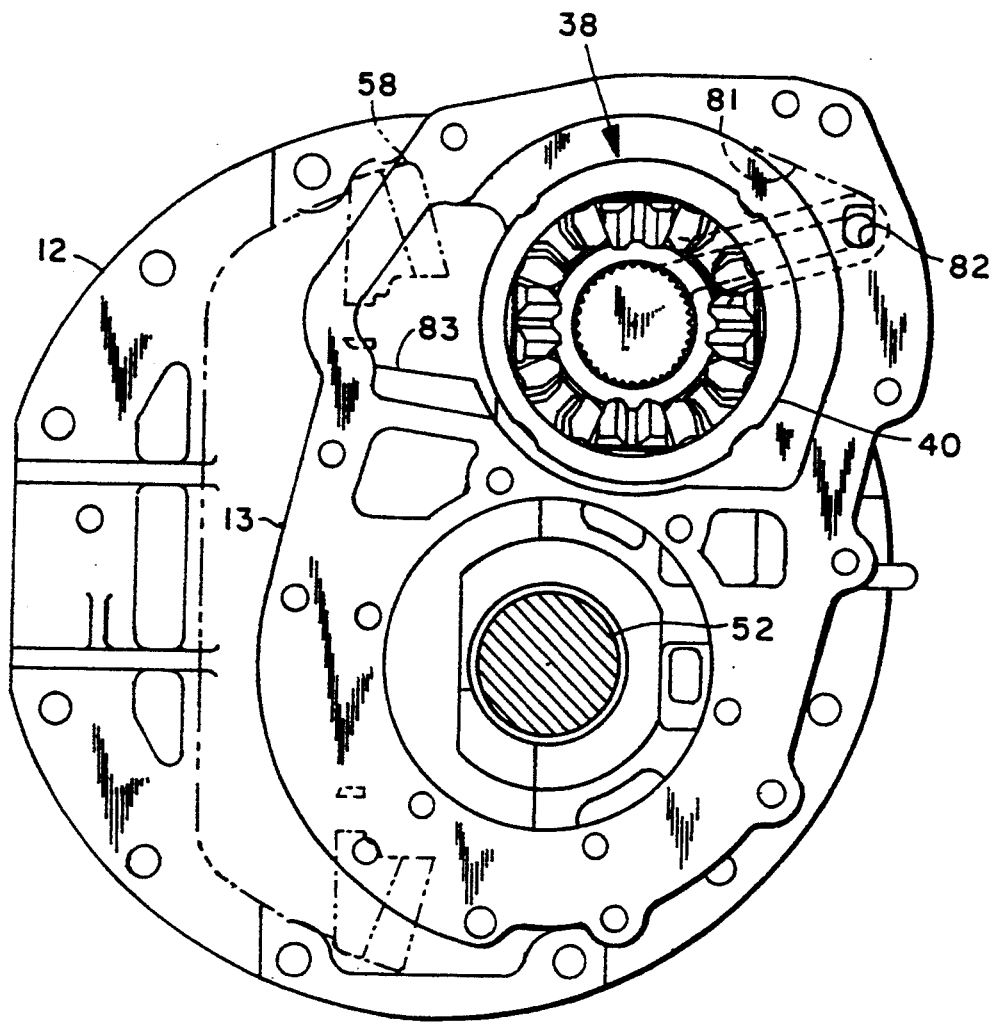
FIG. 3 is a section view taken along section-indicating line 3—3 of FIG. 1.

Referring to FIGS. 2, 3, and 4, the raised diameter portion 68 on input shaft 14 is splined and has drivingly received thereon an annular clutch member 70 which has circumferentially disposed teeth 72 provided on one axial face thereof, which teeth 72 are engageable with corresponding teeth 74 provided on the adjacent axial space of gear 46. Clutch member 70 is engaged in an annular groove 71 thereon with a shift fork 76 which is axially slidable on shaft 73 for effecting movement of member 70 to cause teeth 72 to engage teeth 74 and lock out the differential action power divider 38 and thereby transmitting all power from shaft 14 to the axle with the most available wheel traction. It will be understood that the clutch member 70 is shown in the drawings in its disengaged position whereby power divider 38 is operating in its torque-splitting mode. Shift fork 76 is slidably moved by fluid pressure power piston 78 acting against plunger 80 in response to a fluid pressure shift signal from a remote controller (not shown).

Carrier 12 and cover 13 define a lubricant flow passage 82 which is ported to a window 81 formed in carrier 12, and which receives lubricant slinging from spider 40, which provides a gravity flow of lubricant from the sump within the passage 82 to the input side of bearing 18 for providing lubricant to the bearing race. Passage 82 also extends in the opposite direction in carrier 12 to supply a gravity flow of lubricant to shaft hub 24. A window 83 (see FIGS. 2 and 3) is provided in the front wall of the carrier 12 to permit lubricant slinging from ring gear 58 to reach power divider 38. The opposite or interior side of the bearing 18 is closed to form an annular chamber 85 thereabout by an annular ring or baffle plate 84 which is disposed over the shaft 14 about the raised diameter portion 68 and secured thereto by any suitable expedient, such as press-fitting or weldment. In the embodiment of FIG. 2, the outer periphery of baffle 84 is formed to a cylindrical flange portion 86 which is closely spaced to the housing. In the embodiment illustrated in FIG. 2, a peripheral flexible elastomeric lip seal is mounted on the housing and denoted by reference numeral 88.

At least one and preferably a plurality of axial passages denoted by reference numeral 90 are formed in the enlarged diameter portion 68 of input shaft 14, which passages communicate lubricant from the annular chamber 85 formed by ring 84 with the thrust washer 66 for providing lubrication thereof. It will be understood that the tapered roller bearing arrangement 18 serves as a pump, and creates a slightly positive pressure of the lubricant within the chamber 85 formed about the bearing by the annular ring 84.

Referring to FIG. 5, another embodiment of the annular for bearing 18 is illustrated wherein the annular baffle member 184 has a cylindrical flange 186 formed about its outer periphery, which is precisely fitted into the cover 13 and anchored thereto. The inner periphery of member 184 has a cylindrical flange 185 formed thereon which rotates against a seal ring 187 received in a groove formed in the enlarged diameter portion 68 of the input shaft 14.

Referring to FIG. 6, another embodiment of the annular baffle is illustrated wherein annular seal member 284 has an inner axially-extending cylindrical flange portion 285 which is press-fitted onto a shoulder on enlarged diameter portion 68 of the input shaft. The outer periphery of member 284 has a cylindrical axially-extending flange portion 286 which rotates against a stationary elastomeric seal ring 287 provided in the housing. It will be understood that an axial passage is provided in the enlarged diameter portion 68 of input shaft 14, but is not shown in the embodiment of FIG. 6.

Figure 7:
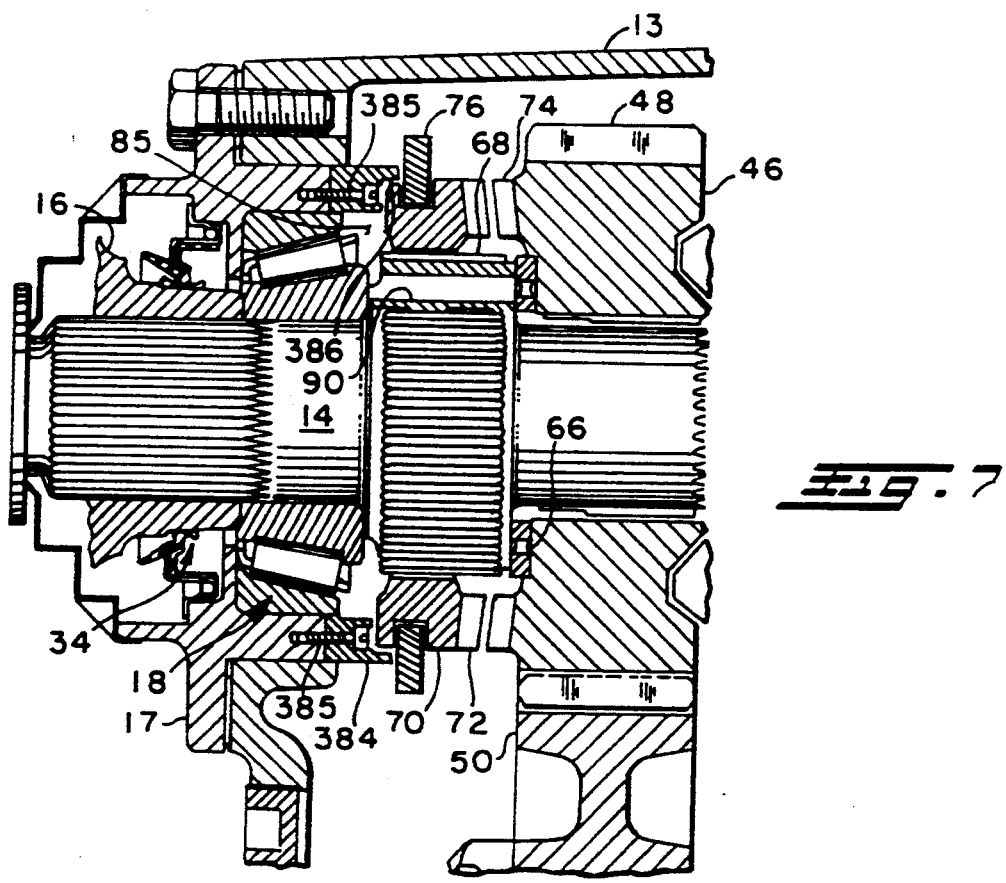
FIG. 7 is a view of a portion of the axle of FIG. 1, showing an alternative embodiment of the invention.

Referring to FIG. 7, another embodiment of the invention is illustrated wherein the annular baffle member defining the chamber about the inside face of the bearing 18 comprises a ring 384 secured to cage 17 by a plurality of fasteners such as screws 385. Ring 384 has an annular surface 386 provided about the inner periphery thereof which surface is spaced radially closely adjacent the outer periphery of clutch member 70; and, surface 386 serves to provide a restricting annular labyrinth passage for return flow of lubricant to the case sump. The member 384 thus forms an annular chamber about the inside face of the bearing 18 which provides a slight positive lubricant pressure to supply the axial passage 90 for providing flow of lubricant to thrust washer 66.

Figure 8:
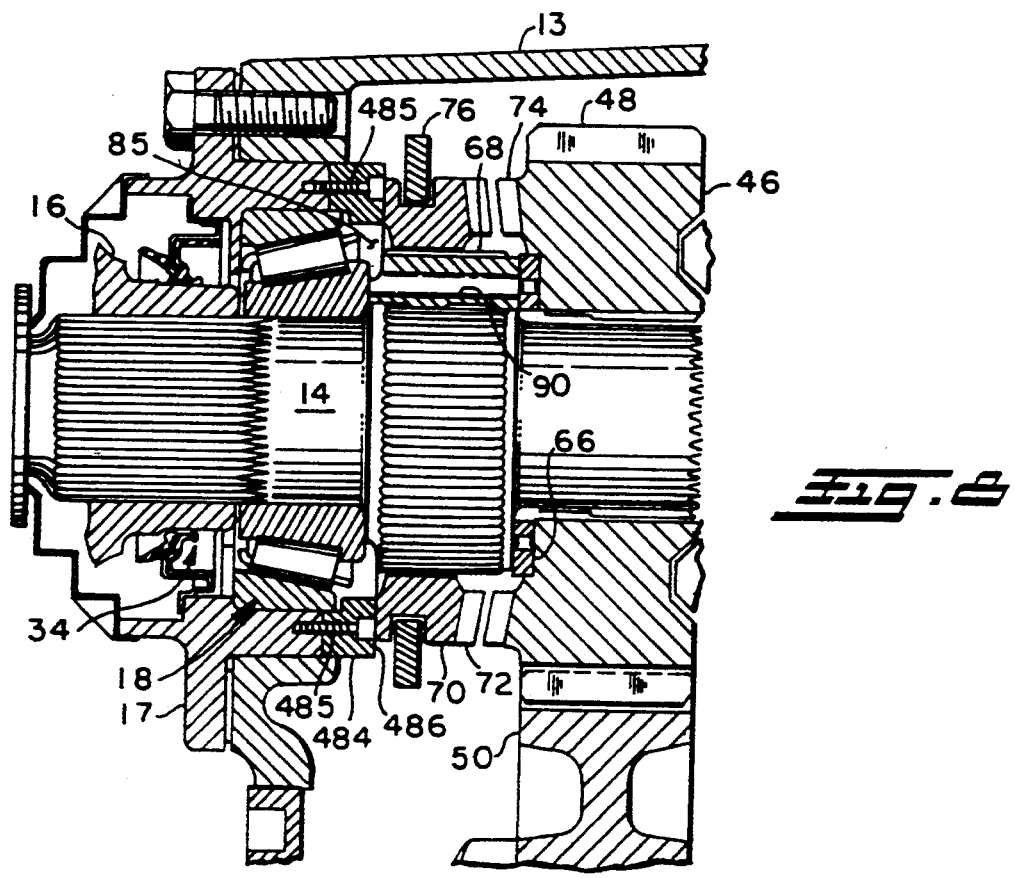
FIG. 8 is a view similar to FIG. 7, showing another embodiment of the invention.

Referring to FIG. 8, another embodiment of the invention is illustrated wherein an annular baffle member 484 is received over input shaft 14 and is secured to the cage 17 by a plurality of fasteners 485 spaced circumferentially thereabout in a manner similar to the embodiment of FIG. 7. The axial face 486 of baffle 484 distal bearing 18 contacts the axial face of clutch member 70 adjacent thereto to provide a rotary frictional contact thereagainst and define a narrow annular passage for oil returning to the sump from the chamber formed about bearing 18 by the member 484. It will be understood that this metering or restricted flow function is operative when the clutch member 70 is in the position shown in FIG. 8; however, when the clutch member is moved to the right to engage teeth 74 on gear 46, the chamber formed by member 484 about bearing 18 is opened to unrestricted oil flow. It will be recognized that when clutch 70 engages gear 46 there is no relative motion of gear 46 with respect to shaft 14; and, therefore, there is no slippage or relative motion of the gear against thrust washer 66 and lubrication of the thrust washer surfaces against gear 46 is not required.

Figure 9:
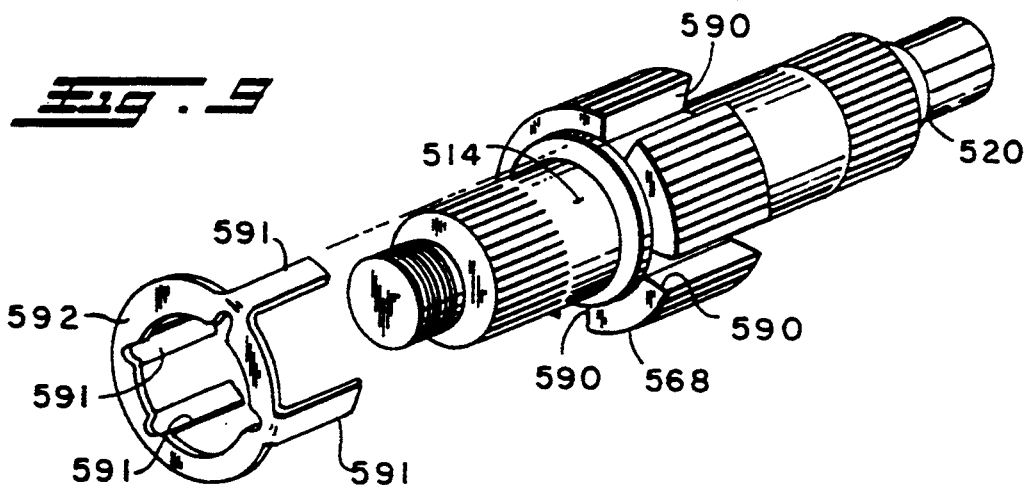
FIG. 9 is a axonometric exploded view of an alternate embodiment of the axial flow passage.
Figure 10:
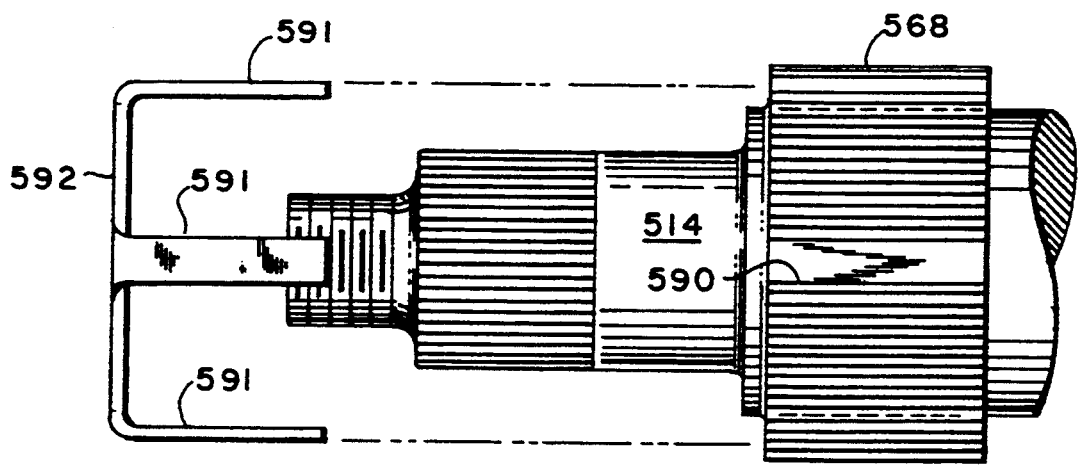
FIG. 10 is a top view of the embodiment of FIG. 9.
Figure 11:
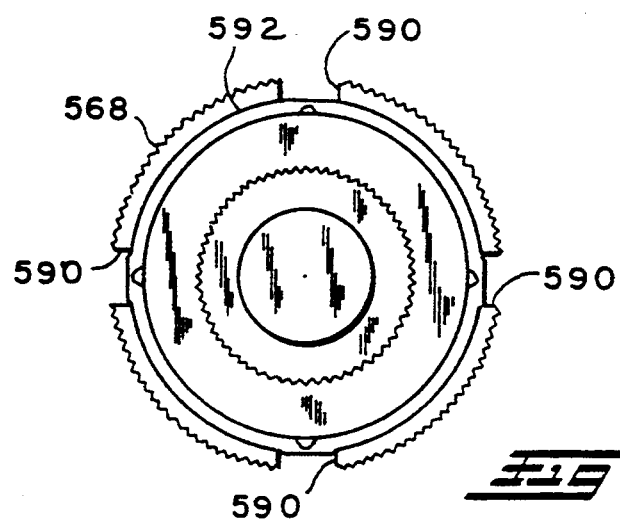
FIG. 11 is an end view of the embodiment of FIG. 9.

Referring to FIGS. 9, 10, and 11, an alternate embodiment of the axial passage through the enlarged portions of the shaft for lubricating the thrust bearing is illustrated. The input shaft 514 in the embodiment of FIG. 8 has enlarged diameter portion 568 thereof formed with a plurality of circumferentially spaced axially-extending slots or grooves 590 formed therein, which grooves may be machined readily from the outer surfaces of the portion 568 in contrast to the drilling of axial holes through the enlarged portion. Each of the passages 590 has received therein in axial sliding engagement with the sides thereof one of a plurality of fingers 591 formed integrally with and extending axially from the periphery of a ring 592 which is received over the shaft 51 4. Each of the fingers 591 thus closes the open groove 590 to form a closed channel therein through which oil is pumped to the thrust washer. The embodiment of FIGS. 9, 10, and 11 thus provides a low-cost way of forming the passages in the enlarged portion of the shaft and provides for the closed oil channels by means of a simple part which may be molded from plastic and assembled over the shaft. The embodiment of FIGS. 9, 10, and 11 eliminates the need for a separate set-up for drilling of axial holes through the enlarged diameter portion of the shaft.

The present invention thus provides a simple, easy-to-manufacture way of providing forced lubrication to the interior components of a power divider or inter-axle differential in tandem driving axles, and particularly to the thrust washer for the driving gear of the axle. Lubricant slinging from the ring gear flows through a window to the inter-axle differential which slings oil over to a window collecting lubricant for gravity flow through a passage to one side of the input shaft bearing. The input shaft bearing has an annular chamber formed on the opposite side by an annular baffle. The bearing pumps lubricant to the annular chamber, which communicates with axial passages formed in the input shaft and which supply lubricant to the interior of the inter-axle differential.

Although the invention has been described hereinabove with respect to the illustrated embodiments, it will be understood that the invention is capable of modification and variation therefrom, and is limited only by the following claims.

We claim:

1. In a drive axle assembly having a housing defining a lubricant sump with an input shaft journalled in a bearing thereon, an output shaft adapted for driving another axle, a power divider interconnecting the input and output shaft, and an axle associated with said housing driven by said divider, and including a ring gear slinging lubricant, the improvement comprising:
  (a) said housing defining a gravity flow passage disposed to receive lubricant slinging from said ring gear, said passage connected to one side of said bearing thereby providing a supply of lubricant to said bearing;
  (b) an annular member defining between portions of said housing and said input shaft, a lubricant chamber about said bearing on the side thereof opposite said one side; and,
  (c) means defining at least one axial passage along said input shaft, said axial passage interconnecting said lubricant chamber with said power divider, wherein said-bearing pumps lubricant from said gravity flow passage into said lubricant chamber and through said axial passage to said power divider.

2. The assembly defined in claim 1, wherein said annular member co-operates with a resilient annular seal member to define said lubricant chamber.

3. The assembly defined in claim 1, wherein said bearing includes a plurality of tapered rollers; and, said annular member is a metal ring fitted onto said input shaft.

4. The assembly defined in claim 1, wherein said annular member is mounted on said housing means and is sealed by an annular seal member rotating with said input shaft.

5. The assembly defined in claim 1, wherein said annular member is mounted for rotation with said input shaft and is sealed by a resilient annular seal member mounted on said housing.

6. The assembly defined in claim 1, wherein said at least one passage includes a plurality of axially extending circumferentially spaced holes through a portion of said input shaft.

7. The assembly defined in claim 1, wherein said at least one passage includes a plurality of axially extending circumferentially spaced open slots formed in a portion of said input shaft and on inserts received in each slot for forming a closed passage therethrough.

8. The assembly defined in claim 1, wherein said passage receives lubricant slinging from the power divider which, in turn, receives lubricant slinging from the ring gear.

9. A differential assembly for a driving axle comprising:
  (a) housing means defining a lubricant sump and having a driven axle journalled thereon with a ring gear slinging lubricant from the sump;
  (b) an input shaft journalled in a bearing on said housing means for rotation about an axis and a side gear carried thereon;
  (c) differential carrier means mounted for rotation with said input shaft and including a plurality of differential gears disposed thereon for rotation about an axis at right angles to and intersecting the axis of rotation of said input shaft and engageable with said input shaft side gear for receiving power therefrom;
  (d) an output shaft associated with said housing means and rotatable thereon about an axis coincident with said input shaft and having thereon a side gear rotatable therewith and engageable with said differential gears, wherein said input shaft side gear, said output shaft side gear, said carrier means, and said differential gears all cooperate to define a differential mechanism;

(e) said housing means defining a passage disposed to receive lubricant slinging from said ring gear and providing gravity flow thereof to one side of said bearing;

(f) an annular baffle member disposed about said input shaft and defining an annular lubricant chamber on the side of said bearing opposite said one side;

(g) said input shaft having portions thereof defining at least one axial passage from said chamber to said spider gears, wherein said bearing pumps lubricant to said chamber and through said at least one passage; and, (h) pinion shaft means operative to receiver power from said differential gears and to drive said ring gear.

10. The assembly defined in claim 9, wherein said annular member rotates with said input shaft and is sealed by an annular resilient seal member sealing between said annular member and said housing means.

11. The assembly defined in claim 9, wherein said annular member is mounted on said housing and is sealed by an annular resilient seal rotating with said input shaft.

12. The assembly defined in claim 9, wherein said bearing includes a plurality of tapered rollers.

* * * * *